(12) United States Patent
Kassis (10) Patent No.: US 10,097,653 B2
(45) Date of Patent: Oct. 9, 2018

(54) DETECTION AND PREVENTION OF INFLATED PLAYS OF AUDIO OR VIDEO CONTENT

(71) Applicant: Google LLC, Mountain View, CA (US)

(72) Inventor: Ronit Kassis, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 220 days.

(21) Appl. No.: 15/145,769

(22) Filed: May 3, 2016

(65) Prior Publication Data

US 2017/0324819 A1 Nov. 9, 2017

(51) Int. Cl.
*H04M 7/00* (2006.01)
*H04L 29/08* (2006.01)
*H04L 29/06* (2006.01)
*H04N 21/442* (2011.01)
*H04N 21/233* (2011.01)

(52) U.S. Cl.
CPC .......... *H04L 67/22* (2013.01); *H04L 65/4092* (2013.01); *H04L 65/602* (2013.01); *H04M 7/0039* (2013.01); *H04N 21/233* (2013.01); *H04N 21/44204* (2013.01); *H04N 21/44218* (2013.01)

(58) Field of Classification Search
CPC ... H04L 43/04; G06F 3/0481; G06F 17/2247; H04N 21/4852; H04N 21/4394; H04M 2207/40; H04H 60/58
See application file for complete search history.

(56) References Cited

U.S. PATENT DOCUMENTS

| 7,548,875 | B2 | 6/2009 | Mikkelsen et al. |
| 8,423,427 | B2 | 4/2013 | Mikkelsen et al. |
| 8,712,825 | B1 | 4/2014 | Holcombe et al. |
| 8,739,294 | B2 | 5/2014 | Risan et al. |
| 8,763,157 | B2 | 6/2014 | Navar et al. |
| 8,849,659 | B2 | 9/2014 | Tran et al. |
| 9,766,769 | B1 * | 9/2017 | Webber ................. G06F 3/0481 |
| 9,831,843 | B1 * | 11/2017 | Das ......................... H03G 3/20 |
| 2005/0097593 | A1 * | 5/2005 | Raley ..................... G06Q 30/02 725/14 |
| 2006/0239503 | A1 * | 10/2006 | Petrovic ................. H04L 9/002 382/100 |
| 2010/0026813 | A1 * | 2/2010 | Hamada .................. H04N 7/08 348/180 |
| 2010/0100212 | A1 * | 4/2010 | Lindahl .................. G10L 21/04 700/94 |

(Continued)

*Primary Examiner* — Aftab N. Khan
(74) *Attorney, Agent, or Firm* — Shumaker & Sieffert, P.A.

(57) ABSTRACT

Some listeners or viewers of online music or video may play the music or video repeatedly without actually listening to or watching the music or video, thereby wasting network resources, reducing bandwidths to other users, and slowing down or creating latency for the downloading of music or video by other users who actually listen to or watch the music or video. In some instances, owners of music or video content may encourage their fans to play the music or video repeatedly to increase their popularity ratings or copyright royalties. Inflated plays of music or video may be detected by applying one or more modifications to the music and monitoring for reactions by users, if any, to the modifications. The lack of a reaction by a user may indicate an inflated playback, whereas the presence of a reaction may indicate that the playback is legitimate.

22 Claims, 4 Drawing Sheets

(56) References Cited

U.S. PATENT DOCUMENTS

| | | | |
|---|---|---|---|
| 2011/0137723 A1* | 6/2011 | Thorn | G06Q 30/02 705/14.49 |
| 2011/0214143 A1* | 9/2011 | Rits | G06F 17/30026 725/34 |
| 2011/0280408 A1* | 11/2011 | Falcon | G06Q 30/02 381/56 |
| 2013/0312120 A1 | 11/2013 | Risan et al. | |
| 2014/0215224 A1 | 7/2014 | Navar et al. | |
| 2015/0287153 A1 | 10/2015 | Kankanala | |
| 2015/0332732 A1* | 11/2015 | Gilson | G11B 27/036 386/240 |

* cited by examiner

DETECTION AND PREVENTION OF INFLATED PLAYS OF AUDIO OR VIDEO CONTENT

BACKGROUND

With high levels of automation in modern user devices, such as computers, laptops, tablets, smartphones or smartwatches, users may be able to play music or video content automatically or nearly automatically at all times, day after day, even if the user does not actually listen to the music or watch the video during those times. Such repeated plays may consume valuable network resources, reduce bandwidths that otherwise would be available to other users of the network, and affect the quality of transmission of audio or video content to other users who actually listen to or watch the audio or video content. In some situations, the copyright owners or licensors may encourage their fans to play their music or video content repeatedly to increase their popularity ratings, to improve their positions on music charts, or to increase their copyright royalties collected from audio or video content stores, Internet radio or television stations, or audio or video streaming service providers if the copyright royalties are based on a fixed royalty rate per playback.

BRIEF SUMMARY

According to an embodiment of the disclosed subject matter, a method of detecting inflated playbacks of audio content downloaded to a device includes applying a modification to a portion of the audio content; transmitting the audio content with the modification to the device; monitoring the device for a reaction by a user of the device to an audible playback of the modification of the portion of the audio content by the device; and determining that the audible playback is an inflated playback if no reaction by the user of the device is detected based on monitoring of the device.

According to an embodiment of the disclosed subject matter, an apparatus for detecting inflated playbacks of audio content includes a memory and a processor communicably coupled to the memory. In an embodiment, the processor is configured to execute instructions to apply a modification to a portion of an audio content; transmit the audio content with the modification to a device; monitor the device for a reaction by a user of the device to an audible playbacks of the modification of the portion of the audio content by the device; and determine that the audible playback is an inflated playback if no reaction by the user of the device is detected based on monitoring of the device.

According to an embodiment of the disclosed subject matter, means for detecting inflated playbacks of audio content downloaded to a device are provided, which include means for applying a modification to a portion of the audio content; means for transmitting the audio content with the modification to the device; means for monitoring the device for a reaction by a user of the device to an audible playback of the modification of the portion of the audio content by the device; and means for determining that the audible playback is an inflated playback if no reaction by the user of the device is detected based on monitoring of the device.

According to an embodiment of the disclosed subject matter, a method of detecting inflated plays of audio content downloaded to a device comprises applying a modification to a portion of the audio content; transmitting the audio content with the modification to said device; monitoring said device for one or more reactions by a user of the device in response to audible playback of the modification during one or more playbacks of at least a part of the audio content by the device; and flagging one or more of said playbacks as one or more inflated plays in response to said monitoring. In some implementations, one or more of said playbacks are flagged as inflated playbacks if no said reaction by the user is detected. In some implementations, the audio content comprises an audio portion of a video stream. In some implementations, the audio content is downloaded from an online content service. In some implementations, the audio content is downloaded by an Internet browser executing on the device. In some implementations, applying the modification to the portion of the audio comprises applying an audible distortion to the portion of the audio, muting the portion of the audio content, inserting a pause into the audio content, changing a bit rate of playback of the portion of the audio content, changing a spectral content of the portion of the audio content, reducing or increasing a volume of the portion of the audio content, or adding one or more acoustic signals to the portion of the audio content. In some implementations, monitoring said device for one or more reactions by a user of the device in response to audible playback of the modification comprises detecting one or more movements of the user device. In some implementations, monitoring said device for one or more reactions by a user of the device in response to audible playback of the modification comprises detecting one or more user adjustments of audio playback volume on said user device, detecting a user stopping a said playback on said devices, detecting a user fast-forwarding a said playback on said device, detecting inputs by a user of the device to initiate re-downloading or replaying of the audio content on said device, or detecting one or more user interface inputs on said one or more user devices.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Some listeners or viewers of online music or video content may play the music or video content repeatedly without actually listening to or watching the music or video, thereby wasting network resources, reducing bandwidths to other users, and slowing down or creating latency for the downloading of music or video content by other users who actually listen to or watch the music or video content. In some instances, owners or licensors of music or video content may encourage their users to play the music or video repeatedly to increase their popularity ratings or their copyright revenues. According to embodiments of the disclosed subject matter, inflated playbacks of an audio content or the audio portion of a video content may be detected by applying an audible modification to the audio content and monitoring for reactions, if any, by the user to the audible modification. The lack of a reaction by the user may indicate an inflated playback, whereas the presence of a reaction may indicate that the playback is legitimate.

The presently-disclosed subject matter relates to methods and apparatus for detecting abuse or preventing attempted abuse by users who play audio or video content from a website or play store repeatedly, without actually listening to or watching the audio or video content. A "user device" may be any device on which audio, video or other types of contents may be played by a user, including but not limited to a desktop or laptop computer, or a mobile device such as a smartphone, a smartwatch, a tablet, or the like. An "application" may include a computer program or software with an interface, such as a user interface, which may enable a user to accomplish a task on a user device. The user interface for an application may include an icon or soft key on a touchscreen of the user device, a physical key or button, a stylus, or a voice input, for example. An application may be developed by one or more software developers. Audio or video content may be played from an Internet website by using an Internet browser, or by using one or more applications installed on a user device, such as a music or video play store, for example.

With high levels of automation in modern user devices, users may be able to download or to play music or video content repeatedly from music or video play stores, Internet radio stations, music or video websites, or other online music or video sources, without actually listening to or watching the music or video content. Some users may set their user devices to play the music or video content repeatedly for various reasons, including, for example, in response to encouragement by the artists, labels, publishers, or copyright owners or licensors. In some instances, owners or licensors of copyrighted music or video content may encourage their fans to download or to play the music or video content repeatedly to increase their popularity ratings or revenues from copyright royalties. Regardless of the motivations, repeated, automated or robotic plays of online music or video content may consume valuable network resources, reduce bandwidths to other users of the network, and slow down or create latency in the downloading of music or video content by other users who actually listen to or watch the music or video content.

Figure 1:
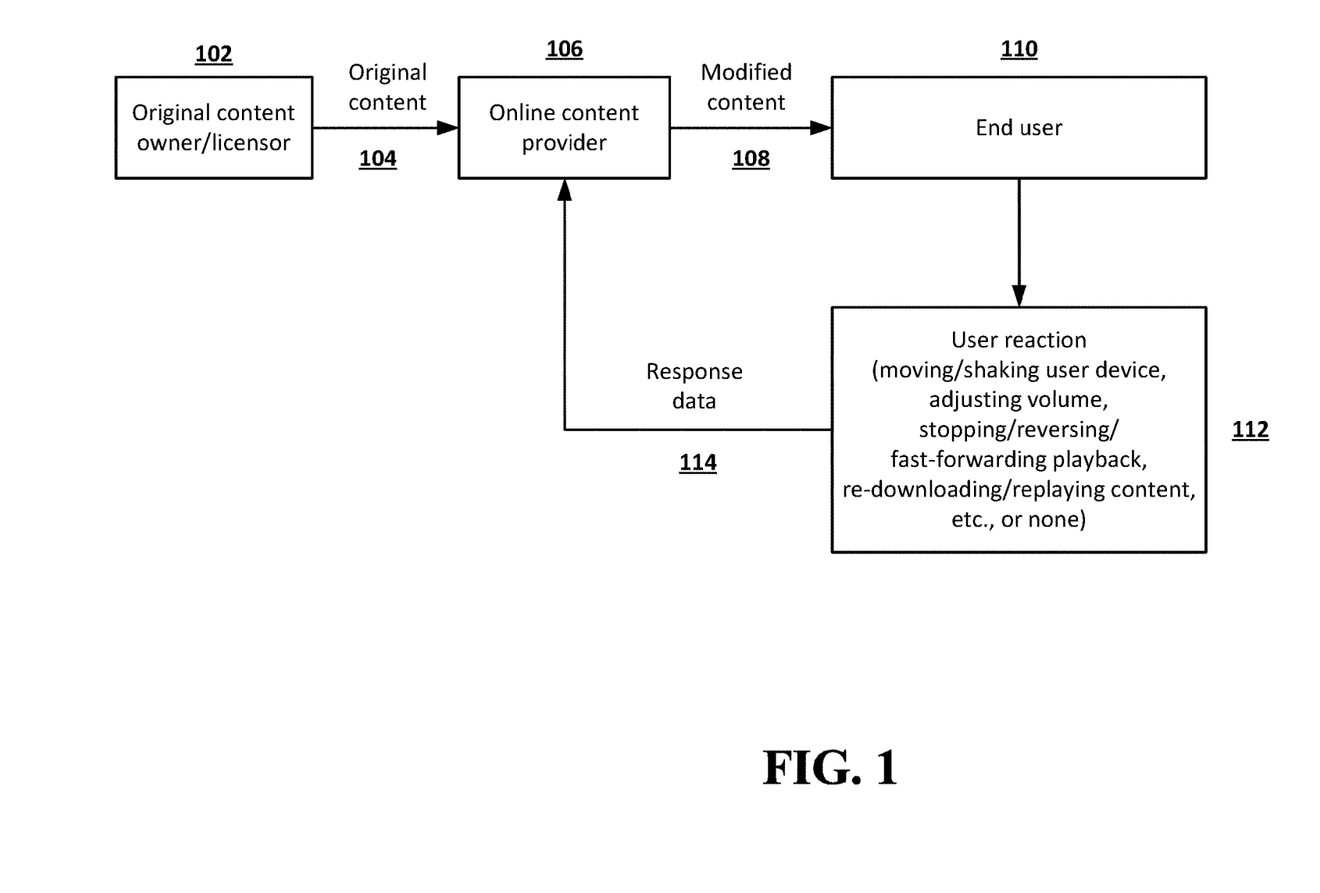
FIG. 1 shows an example of providing modified online audio or video content to a user and monitoring for a reaction from the user in response to the modified audio or video content.

FIG. 1 shows an example of providing modified online audio or video content to a user and monitoring for a reaction from the user in response to the modified audio or video content. In FIG. 1, the owner or licensor of original audio or video content in block 102 transmits the original audio or video content 104 to an online content provider 106, which may be an online play store, an Internet radio or television station, an audio or video streaming service provider, or another type of audio or video content provider. In order to detect whether an end user is actually listening to or watching the audio or video content or merely playing back the audio or video content repeatedly or automatically without actually listening to or watching the content, the online content provider 106 may apply one or more modifications to one or more portions of the audio or video content, and transmit the modified audio or video content 108 to the end user 110.

Modifications applied to the audio or video content may include one or more audible distortions to the audio content or to the audio portion of the video content. For example, audible distortions to the audio content or to the audio portion of the video content that may be expected to trigger a reaction by an actual listener or viewer may include muting a portion of the audio content, a pause at some point in the playback of the audio content, a modification to the bit rate in at least a portion of the audio content that results in an audible change in the playback, a modification to the spectral content of at least a portion of the audio content, an abrupt increase or decrease in the playback volume of at least a portion of the audio content, or injection of an acoustic signal that is not normally expected to be part of the audio content, for example, the injection of a beep, a buzz, a ringtone or a noise in a music soundtrack. If the user is actually listening to or watching the modified audio or video content, the user may react to the modified content in various manners, for example, by moving or shaking the user device, adjusting the volume on the user device, stopping, reversing or fast-forwarding the playback on the user device, re-downloading or replaying the content, or another type of user reaction detectable on the user device, as indicated in block 112. If the user is merely robotically playing the audio or video content without actually listening to or watching it, then no reaction may be detected on the user device. Response data 114 indicative of one or more user reactions by the user, or the lack thereof, may be transmitted back to the online content provider 106 in FIG. 1.

Figure 2:
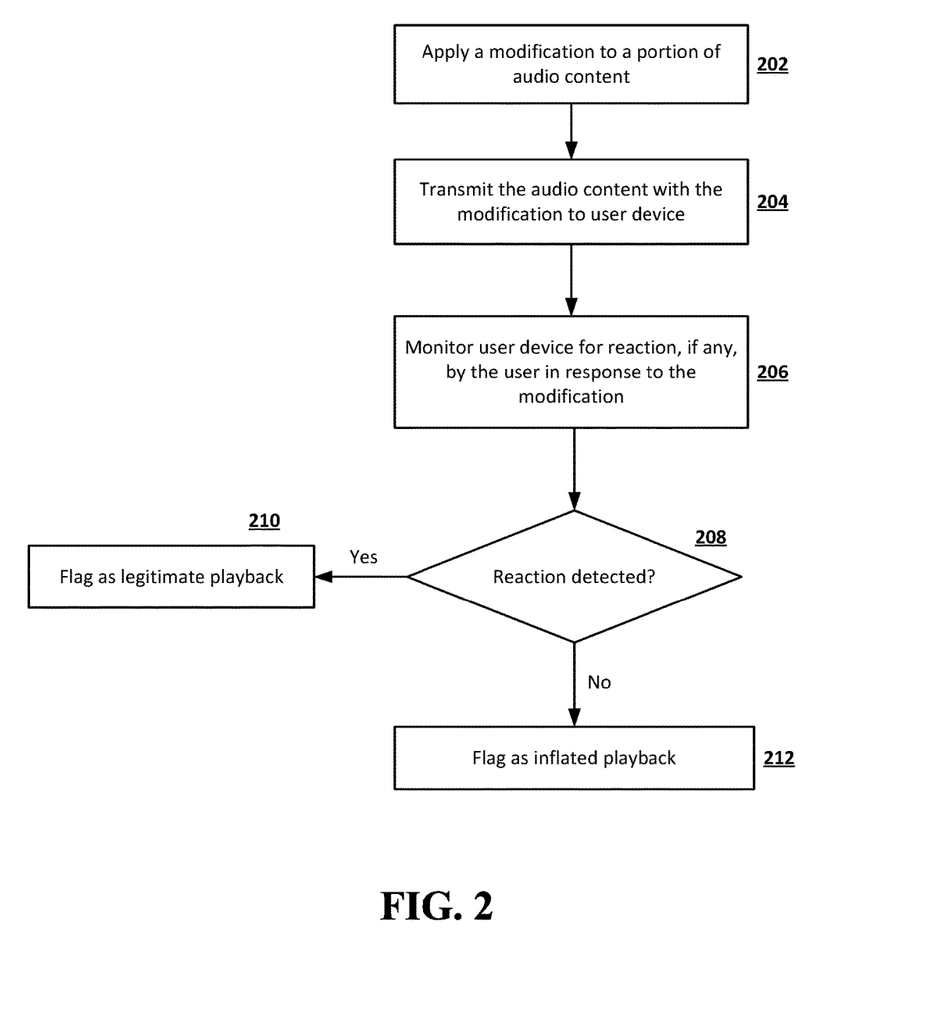
FIG. 2 shows an example of a process of monitoring for inflated playbacks by a user of online audio or video content according to an embodiment of the disclosed subject matter.

FIG. 2 shows an example of a process of monitoring for inflated plays by users of online audio or video content according to an embodiment of the disclosed subject matter. In order to test whether a user is actually listening to an audio stream or to the audio portion of a video stream, a modification may be applied to a portion of the audio stream in block 202. The modification may be introduced to the audio stream or to the audio portion of the video stream by the owner of a play store, a website, or a server that provides audio or video streaming, for example. The user may download the audio or video content from an audio or video play store, an Internet radio or television station, or an Internet browser, for example. Downloading of audio or video content from the content provider or server may be achieved through one or more wired or wireless connections.

Modifications to one or more portions of an audio stream may be made in various manners that are expected to trigger one or more reactions by a user who is actually listening to the audio stream. For example, a modification may be applied to a portion of an audio stream, such as a music soundtrack, by distorting the portion of the audio stream such that the music would sound abnormal to a user who is actually listening to the music. As another example, a modification may be applied to a portion of an audio stream by muting the portion of the audio stream. As another example, a modification may be applied to a portion of the audio stream by pausing the playback at some point in the audio stream. In some implementations, pausing of the playback of the audio stream may last for a limited time duration that is perceptible to a normal human listener, for example, a second or a few seconds, such that a user who is actually listening to the audio may be expected to react. In some implementations, the pausing of the playback of the audio stream on a user device may continue until the user has reacted to the pause.

As another example, a modification may be applied to a portion of the audio stream by changing the bit rate of playback of that portion of the audio stream, such that a distortion due to the change in the bit rate is perceptible to a normal human listener. As another example, a modification may be applied to a portion of the audio stream by changing the spectral content of the portion of the audio stream. As another example, a modification may be applied to a portion of the audio stream by decreasing or increasing the sound volume of that portion of the audio stream. For example, if the volume of music is suddenly decreased or increased substantially during the play of a music soundtrack, then a user who is actually listening to the music may be expected to react to the sudden decrease or increase in the volume on the user device.

As yet another example, a modification to a portion of the audio stream may be made by inserting one or more acoustic signals into that portion of the audio stream. Such acoustic signals may include the types of sounds not normally expected to be present in the audio stream. For example, in a music soundtrack, an acoustic signal such as a beep, a buzz, a ringtone, or a noise that is not normally expected to be part of the music, may be introduced into the soundtrack. A user who is actually listening to the music may be expected to react to the sudden introduction of such acoustic signals. In the examples described above, various types of modifications may be introduced to one or more portions of an audio stream such as a music soundtrack, or to one or more portions of the audio portion of a video stream. For example, a user who is actually watching a music video may be expected to react to such modifications to the audio portion of the music video.

Referring to FIG. 2, after the modification is applied to a portion of the audio content in block 202, the audio content with the applied modification may be transmitted to one or more user devices in block 204, by the provider of the audio content from one or more servers, for example. A user may play back the modified audio stream from a play store or an Internet browser on a user device, for example. After the modified audio content is transmitted, the provider of the audio content may monitor the user device for reactions, if any, by the user, in response to the playback of the modified audio stream in block 206. If a reaction is not detected from the user device in block 208, then the playback of audio or video content on that user device may be flagged as an inflated playback in block 210. On the other hand, if a reaction is detected from the user device in block 208, then the playback of the audio or video content on that user device may be flagged as a legitimate play in block 212.

A user who is actually listening to the audio content may normally react to a sudden or unexpected audible modification to the audio content in various manners. For example, the user may react to the sudden or unexpected modification to the audio content be moving or shaking the user device on which the audio content is being played. Such a user device may be a mobile device, for example, a smartphone, a smartwatch, a pad, or the like. Some mobile devices, for example, mobile devices that are capable of position location, may be equipped with one or more movement sensors such as a magnetometer, an accelerometer, a gyroscope, a piezoelectric device, or the like, that may detect a movement such as shaking of the device by the user. A movement such as a shaking of the user device may be an indication that the user is actually listening to the audio content and is reacting to the sudden or unexpected modification to the audio content. In response to detecting such a movement or shaking, the playback of the audio content on that user device may be flagged as a legitimate play.

Instead of or in addition to moving or shaking the user device, the user may react to a modification to a portion of an audio stream by manually adjusting the sound volume on the user device. For example, if the modification to the audio stream includes muting a portion the audio stream, pausing the playback at a certain point of the audio stream, or suddenly decreasing or increasing the volume of the audio stream, then the user who is actually listening to the audio stream may manually adjust the volume on the user device in an attempt to compensate for the modification introduced to the audio stream. Such a manual adjustment to the volume may be detected by the user device, and the playback may be flagged as a legitimate playback.

In some instances, the user who is actually listening to the audio content may react to a sudden or unexpected modification by manually stopping the playback, or reversing or fast-forwarding the playback on the user device. For example, if a distortion or change in the spectral content is applied to a portion of a music soundtrack, a user who is actually listening to the music may stop the playback to avoid listening to the music that has been distorted. In some instances, the user may reverse the playback in an attempt to listen to the music again. In some instances, the user may fast-forward the playback in an attempt to skip over the modified portion of the audio content. In some instances, the user who is actually listening to the audio content may react to a sudden or unexpected modification of the audio content by initiating re-downloading or replaying of the audio content on the user device, for example. The user may also react to audible modifications or distortions of the audio content in various other manners by performing one or more acts on the user device. Any of such user reactions may be regarded as an indication that the user is actually listening to the audio content or watching the video content which includes the audio content that has been modified.

On some user devices such as smartphones, smartwatches or pads, a user may react to a sudden or unexpected modification to an audio stream or an audio portion of a video stream by one or more interactions with one or more user interfaces, such as a graphic user interface (GUI). In some instances, a user may react to the unexpected modification by making a key input, a button input, a stylus input, a touchscreen input, a voice command input, or the like. A user input to adjust the volume of the audio playback, to stop, reverse or fast-forward the playback of the audio content, or to re-download or replay the audio content in response to the modification may be regarded as an indication that the user is actually listening to the audio content. Such an indication may be transmitted to the network which allows the owner of the play store or website that provides audio or video streaming service to determine that the user is an actual listener or viewer who is not merely repetitively downloading or playing the music or video. Moreover, other types of reactions such as sudden movements of the user device in response to unexpected modifications of the audio content detected by one or more movement sensors on the user device may also serve as an indication that the user is an actual listener or viewer, and such an indication may be transmitted to the owner of the play store or website through the network.

In some instances, it may be unnecessary to monitor the usage pattern of each individual user. For example, in order to detect potential abuse by a copyright owner or licensor, the system may only need to monitor the usage patterns of a large number of users, for example, a large number of listeners in the fan base of an artist or label. In some implementations, a large group of users instead of each individual user may be monitored to detect inflated playbacks. The owner or licensor of the copyright of the music or video content may encourage its fan base to play the music or video content repeatedly to increase its popularity ratings or copyright revenue, without regard to the waste of network resources and slowing down of network access caused by the repeated playbacks of music or video. In such instances, statistics of abuse by repeated playbacks of music or video content may be compiled against the copyright owner or licensor instead of against the individual user.

In some situations, however, monitoring of individual users or types of users may be desirable to identify users or types of users that have exhibited patterns of repeatedly playing the music or video content without actually listening to or watching it. In some implementations, warnings may be sent out to users who abuse network resources and available bandwidths. In some implementations, the system may prevent a user from replaying the same music or video after one or more warnings in order to conserve network resources and to make bandwidths available to other legitimate users. Upon determining that there are one or more instances in which no reaction is detected from the user device after a modification is introduced into an audio stream such as a music soundtrack, or into the audio portion of a video stream, the system may take some action regarding the user in addition to flagging inflated playbacks. For example, the system may cull the connection between the user and the website or play store that provides the content. In some situations, a single instance or a few occasional instances of the absence of reactions to modifications of the audio content may be excusable. However, actions may be taken against users who have repeatedly ignored modifications to the audio content. In some implementations, the system may keep a record of users, devices or accounts which have shown a repeated lack of responses to modifications applied to the audio content. For example, actions such as transmitting warnings to the user, terminating the repeated downloading of the same audio or video content, or suspending or terminating the user account, may be taken against a user if the number of non-responses exceeds a threshold within a given period of time. As a specific example, a play store or website connection may be terminated if no reaction is detected from the user device in response to modifications to the audio or video content more than three times per day. However, even in implementations in which user activity is used as disclosed herein, individual users may be provided an opportunity to control whether such information is collected by the system. Alternatively or in addition, the playback information disclosed herein may be maintained separately from other user information, so that for example, it does not include any personally-identifiable information about individual users. As a specific example, although a user account may be automatically marked as exhibiting patterns of repeatedly playing content as disclosed herein, such indication may be stored, manipulated, and otherwise treated separately from some or all other information about the user's account, such as the user's name or other personally-identifiable information.

More generally, in situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. As another example, although the identity of the device may be monitored for multiple repeated playbacks of online audio or video content, personal information associated with the user of that device may not be necessary for a system to compile histories or statistics of legitimate or inflated playbacks of online audio or video content on that particular device. Thus, the user may have control over how information is collected about the user and used by a system as disclosed herein.

Figure 3:
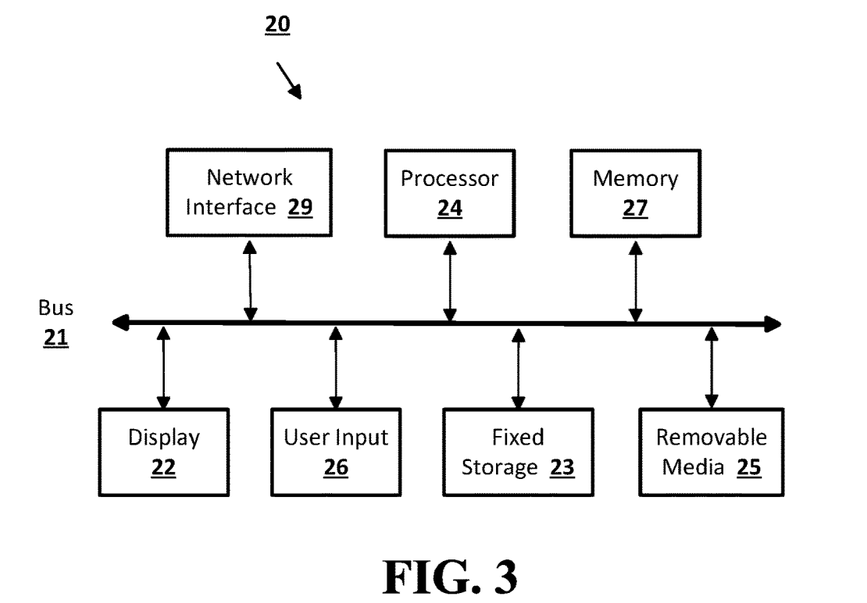
FIG. 3 shows an example of a computing device according to an embodiment of the disclosed subject matter.

Embodiments of the presently disclosed subject matter may be implemented in and used with a variety of component and network architectures. FIG. 3 is an example of a computing device 20 suitable for implementing embodiments of the presently disclosed subject matter. The device 20 may be, for example, a user device such as a desktop or laptop computer, or a mobile computing device such as a smart phone, tablet, or the like. In some implementations, the device 20 may be a computer or an application store server that performs one or more of the functions described above. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output System (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
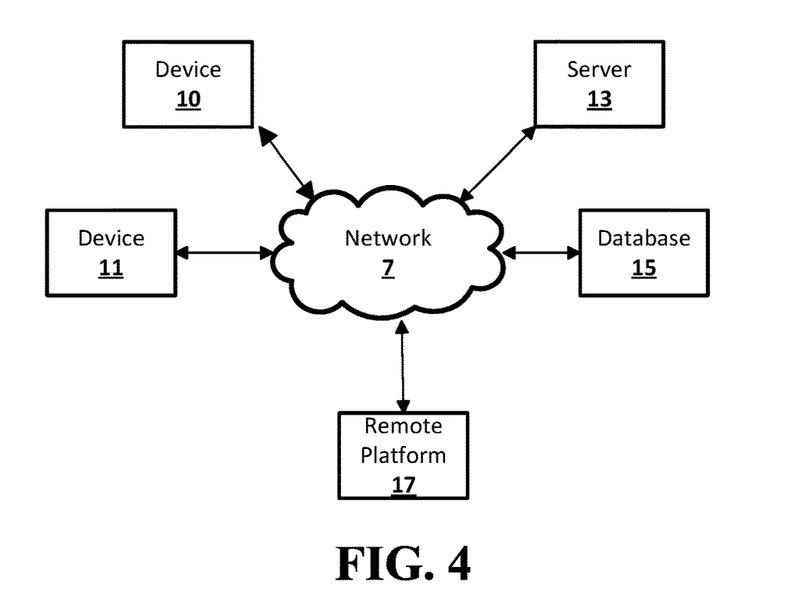
FIG. 4 shows an example of a network configuration according to an embodiment of the disclosed subject matter.

FIG. 4 shows an example of a network configuration according to an embodiment of the disclosed subject matter. One or more devices 10, 11, such as user devices, local computers, smartphones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15. In some implementations, the server 13 may be an application store server that is capable of performing any of the processes described above.

Figure 5:
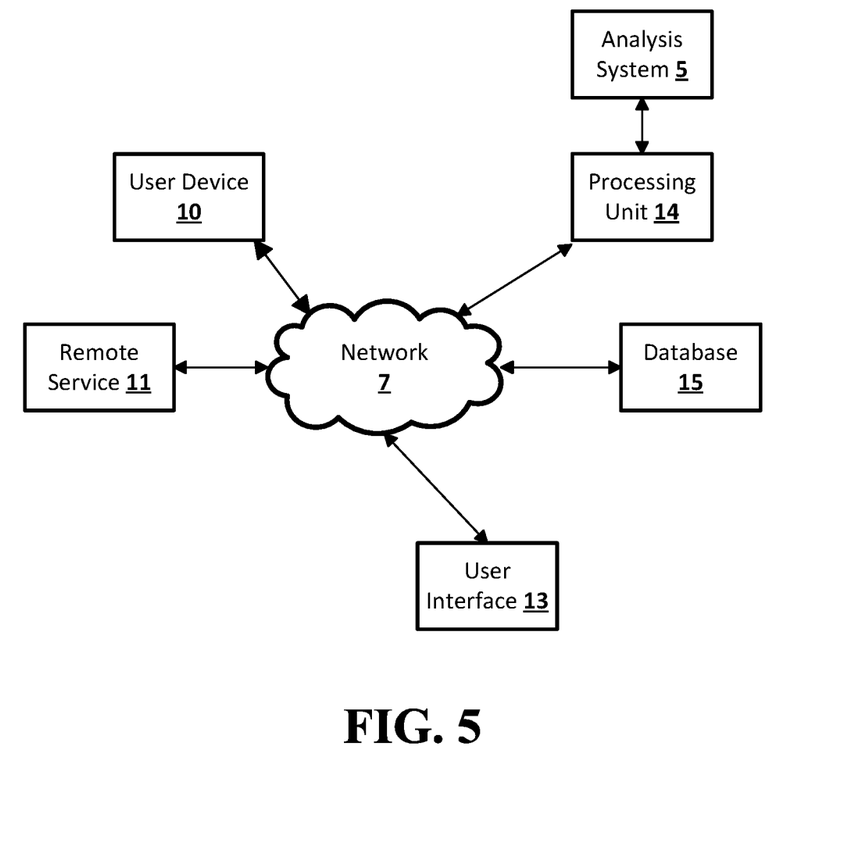
FIG. 5 shows another example of a network configuration according to an embodiment of the disclosed subject matter.

FIG. 5 shows another example of a network configuration according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices or systems 10, 11 may communicate with one or more remote computer systems, such as processing units 14, databases 15, and user interface systems 13. In some cases, the devices or systems 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning or analysis system 5 may provide various prediction models, data analysis, or the like to one or more other systems 13, 14, 15. In some implementations, any computing device associated with the network 7, such as the analysis system 5, the remote service client 11, or the processing unit 14, may perform any of the processes described above.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of verifying whether a user is listening to an audible playback generated from audio content obtained from a multimedia streaming service, the method comprising:
   applying, by a computing system, a modification to a portion of the audio content to trigger user inputs at a computing device associated with the user that are used to determine whether the user of the computing device is listening, via the computing device, to the audible playback generated from the audio content with the modification;
   transmitting, by the computing system, to the computing device, the audio content with the modification;
   receiving, by the computing system, from the computing device, an indication of at least one user input obtained by the computing device while the computing device outputs the audible playback generated from the audio content with the modification;
   determining, by the computing system, based at least in part on the at least one user input, whether or not the user is actually listening, via the computing device, to the audible playback generated from the audio content with the modification;
   responsive to determining that the user is not actually listening to the audible playback generated from the audio content with the modification, determining a quantity of warnings transmitted to the computing device when the multimedia streaming service determined the user was not actually listening to other audible playbacks; and
   responsive to determining that the quantity of warnings exceeds a threshold, terminating, by the computing system, a connection between the computing device and the multimedia streaming service.

2. The method of claim 1, wherein the audio content comprises an audio portion of a video stream or a song.

3. The method of claim 1, further comprising:
   responsive to determining that the quantity of warnings does not exceed the threshold, transmitting, to the computing device, for subsequent playback or display, a warning when the multimedia streaming service determines the user is not actually listening to the audible playback.

4. The method of claim 1, wherein the at least one user input is associated with at least one of:
   an adjustment of an audio playback volume on the computing device;
   a stopping of the audible playback on the computing device;
   a reversing of the audible playback on the computing device;
   a fast-forwarding of the audible playback on the computing device; and
   a command to re-stream the audio content on the computing device.

5. The method of claim 1, wherein the at least one user input comprises at least one of:
   a key input;
   a button input;
   a stylus input;
   a touchscreen input; and
   a voice input.

6. The method of claim 1, wherein applying the modification to the portion of the audio content comprises applying an audible distortion to the portion of the audio content.

7. The method of claim 6, wherein the audible distortion comprises a distortion selected from at least one of:
   a muting of the portion of the audio content;
   a pause in the portion of the audio content;
   a modification to a bit rate of the audible playback of the portion of the audio content;
   a modification to a spectral content of the portion of the audio content;
   an increase in a volume of the portion of the audio content;
   a decrease in the volume of the portion of the audio content; and
   an acoustic signal in the portion of the audio content.

8. The method of claim 7, wherein the acoustic signal comprises a signal selected from at least one of:
   a beep;
   a buzz;
   a ringtone; and
   a noise.

9. The method of claim 1, wherein the at least one user input comprises an indication of movement of the computing device.

10. The method of claim 9, wherein the movement is detected by a sensor of the computing device, the sensor comprising at least one of:
    a magnetometer;
    an accelerometer;
    a gyroscope; and
    a piezoelectric device.

11. The method of claim 1, wherein the audio content is transmitted to an application executing at the computing device.

12. The method of claim 11, wherein the application comprises an Internet browser.

13. A computing system comprising:
    a memory comprising instructions; and
    a processor communicably coupled to the memory, the processor configured to execute the instructions to:
       apply a modification to a portion of an audio content to trigger user inputs at a computing device that are used to determine whether a user of the computing device is listening, via the computing device, to the audible playback generated from the audio content with the modification;
       transmit, to the computing device, the audio content with the modification;
       receive, from the computing device, an indication of at least one user input obtained by the computing device while the computing device outputs the audible playback generated from the audio content with the modification;
       determine, based at least in part on the at least one user input, whether or not the user is actually listening, via the computing device, to the audible playback generated from the audio content with the modification;
       responsive to determining that the user is not actually listening to the audible playback generated from the audio content with the modification, determine a quantity of warnings transmitted to the computing device when the multimedia streaming service determined the user was not actually listening to other audible playbacks; and responsive to determining that the quantity of warnings exceeds a threshold, terminate a connection between the computing device and the multimedia streaming service.

14. The computing system of claim 13, wherein the audio content comprises an audio portion of a video stream or a song.

15. The computing system of claim 13, wherein the at least one user input is associated with at least one of:
   an adjustment of an audio playback volume on the computing device;
   a stopping of the audible playback on the computing device;
   a reversing of the audible playback on the computing device;
   a fast-forwarding of the audible playback on the computing device; and
   a command to re-stream the audio content on the computing device.

16. The computing system of claim 13, wherein the at least one user input comprises at least one of:
   a key input;
   a button input;
   a stylus input;
   a touchscreen input; and
   a voice input.

17. The computing system of claim 13, wherein the processor is configured to execute the instructions to apply the modification to the portion of the audio content by at least applying an audible distortion to the portion of the audio content.

18. The computing system of claim 17, wherein the audible distortion comprises a distortion selected from at least one of:
   a muting of the portion of the audio content;
   a pause in the portion of the audio content;
   a modification to a bit rate of the audible playback of the portion of the audio content;
   a modification to a spectral content of the portion of the audio content;
   an increase in a volume of the portion of the audio content;
   a decrease in the volume of the portion of the audio content; and
   an acoustic signal in the portion of the audio content.

19. The computing system of claim 18, wherein the acoustic signal comprises a signal selected from at least one of:
   a beep;
   a buzz;
   a ringtone; and
   a noise.

20. The computing system of claim 13, wherein the at least one user input comprises an indication of movement of the computing device.

21. The computing system of claim 20, wherein the movement is detected by a sensor of the computing device, the sensor comprising at least one of:
   a magnetometer;
   an accelerometer;
   a gyroscope; and
   a piezoelectric device.

22. A non-transitory computer readable medium encoded with instructions that, when executed by at least one processor of a computing system, cause the at least one processor to:
   apply a modification to a portion of an audio content to trigger user inputs at a computing device that are used to determine whether a user of the computing device is listening, via the computing device, to the audible playback generated from the audio content with the modification;
   transmit, to the computing device, the audio content with the modification;
   receive, from the computing device, an indication of at least one user input obtained by the computing device while the computing device outputs the audible playback generated from the audio content with the modification;
   determine, based at least in part on the at least one user input, whether or not the user is actually listening, via the computing device, to the audible playback generated from the audio content with the modification;
   responsive to determining that the user is not actually listening to the audible playback generated from the audio content with the modification, determine a quantity of warnings transmitted to the computing device when the multimedia streaming service determined the user was not actually listening to other audible playbacks; and
   responsive to determining that the quantity of warnings exceeds a threshold, terminate a connection between the computing device and the multimedia streaming service.

* * * * *